United States Patent Office 2,789,078
Patented Apr. 16, 1957

2,789,078
DISINFECTING AND DEODORIZING COMPOSITIONS AND METHOD OF USING SAME

Ralf B. Trusler, Dayton, Ohio, assignor to The Davies-Young Soap Company, Dayton, Ohio No Drawing. Application April 20, 1953,
Serial No. 349,960

12 Claims. (Cl. 167—33)

This invention relates to improved disinfecting or sterilizing compositions and more particularly to such compositions comprising 1,3-dihalo-5,5-dimethylhydantoin.

The compound 1,3-dichloro-5,5-dimethylhydantoin, which is a stable solid under anhydrous conditions, decomposes in the presence of moisture, with evolution of chlorine. This decomposition and evolution of chlorine in the presence of moisture takes place rapidly under normal conditions, the rates of decomposition and chlorine evolution proceeding too rapidly to render the compound useful for those disinfecting or sterilizing purposes which require a slow, steady, controlled generation of chlorine over prolonged periods of time.

The primary object of this invention is to provide new compositions comprising 1,3-dichloro-5,5-dimethylhydantoin which, in the presence of moisture, decompose slowly and evolve chlorine at a steady, controlled rate over a relatively long period of time.

The composition of the invention is a stable, normally solid mixture of 1,3-dichloro-5,5-dimethylhydantoin and at least one compatible, preferably non-reactive, water-insoluble or substantially water-insoluble organic solid which retards the rate at which the hydantoin decomposes and evolves chlorine in the presence of moisture. Various water-insoluble organic substances which are compatible with and chemically inert to the hydantoin may be used as the decomposition retardant therefor. In a presently preferred embodiment, the decomposition retardant is a normally solid organic material which vaporizes at room temperature and functions as a deodorant by masking unpleasant odors. Examples of the readily vaporizable substances which may be mixed with the 1,3-dichloro-5,5-dimethylhydantoin include naphthalene, paradichlorobenzene, hexachloroethane, 4,4-dimethyl benzophenone, o-diphenyl benzene and camphor.

The compositions may comprise the 1,3-dichloro-5,5-dimethylhydantoin and decomposition retardant in a wide range of proportions from 5% to 95% by weight of the one, to 95% to 5% of the other. A plurality of the decomposition retardants may be mixed with the hydantoin.

The compositions may take any suitable solid form. Thus, the particulate 1,3-dichloro-5,5-dimethylhydantoin and particulate retardant may be mixed in the desired relative proportions and used in the particulate form, or the mixed particles may be compressed to obtain aggregates of any suitable size and shape and which may be crushed, subsequently, into aggregates of another size where smaller aggregates are desired.

In a preferred embodiment, however, the hydantoin and decomposition retardant are mixed in the particulate condition and then fused to obtain a fluid mass which may be molded to obtain the mixture in any desired geometric form and to fit any special shape of dispensing container. For example, the fused mixture may be molded in the shape of blocks, cakes or the like which may be provided with means for supporting or suspending them, in use, such as holes and wires for hanging the molded mass in closets.

It is found that, when the compositions of the invention are exposed to moisture, decomposition of the 1,3-dichloro-5,5-dimethylhydantoin takes place much more slowly than is normally the case and, consequently the chlorine is evolved more slowly. Although the rate of decomposition of the hydantoin is retarded, the decomposition proceeds continuously and, therefore, chlorine is generated continuously over a long period of time and practically throughout the entire period during which molded products comprising the mixture retain their integrity, that is, during the entire period of slow solution and evaporation of the molded product.

The preferred decomposition retardants mentioned are readily vaporizable substances which function as deodorants by giving off a characteristic odor which masks offensive smells. For example, naphthalene and paradichlorobenzene have been used widely for deodorizing purposes.

The products of this invention in which one or more of those readily vaporizable substances is (are) used as the decomposition retardant for the 1,3-dichloro-5,5-dimethylhydantoin, have the capacity to mask unpleasant odors, due to the emission of vapors of the retardant, and also evolve, continuously over a relatively long period of time, sufficient chlorine to render a condition of sterility in their proximity and to insure the presence of sufficient chlorine in water passed in contact therewith that when such water is added to relatively larger amounts of water the latter is disinfected and deodorized.

The following table (Table I) illustrates the results obtained when a series of molded cakes 2" in diameter and about 1" thick were placed in uncovered 2-liter beakers each containing a liter of distilled water. The cakes were obtained by fusing varying proportions of 1,3-dichloro-5,5-dimethylhydantoin and para-dichloro benzene together, pouring the fused mixtures into 2" round molds, and allowing the mixtures to cool and set in the molds. After the cakes had been immersed in the water in the beakers for 30 minutes, the water in each beaker was tested for chlorine at intervals over a five-day period, with the results shown in the table. An Enslow slide chlorimeter was used in making the tests. In the table, the letters A to E inclusive designate molded cakes comprising the 1,3-dichloro-5,5-dimethylhydantoin in amounts of 5, 20, 40, 60 and 80% by weight respectively, and parachlorobenzene in amounts of 95, 80, 60, 40 and 20% respectively.

*Table I*
[Chlorine in parts/million.]

|   | 30 Mins. | 2 Hrs. | 18 Hrs. | 24 Hrs. | 48 Hrs. | 5 Days |
|---|---|---|---|---|---|---|
| A | 6 | 12 | 17 | 19 | 19 | 20 |
| B | 17 | 19 | 19 | 19 | 19 | 20 |
| C | 18 | 20 | 20 | 20 | 20 | 21 |
| D | 24 | 27 | 27 | 28 | 28 | 28 |
| E | 31 | 30 | 31 | 31 | 32 | 33 |

It was found that chlorine which escaped as vapor from the water solutions was replaced by additional chlorine evolved from the molded cakes. The cakes provided a reservoir from which chlorine was derived over a period of days, and also served to maintain the mixed ingredients in a compact condition, so that the water remained free from loose particles.

It is noteworthy that even the compositions of the invention which comprise as low as 5% by weight of 1,3-dichloro-5,5-dimethylhydantoin supplied the water with a sufficient concentration of chlorine to kill bacteria.

Thus, the concentration of chlorine in the water containing the cakes designated A in Table I, which comprised 5% of the hydantoin, varied between 6 and 20 parts/million parts of water for immersion periods of 30 minutes to five days, whereas the concentration of chlorine in solution in water for sanitation purposes is generally regarded as being about 2 p. p. m.

Although the rates of decomposition and of chlorine evolution are slower for all compositions comprising the blend of 1,3-dichloro-5,5-dimethylhydantoin than when the hydantoin per se is exposed to moisture, the decomposition and chlorine generation rates are influenced and regulated by the particular retardant admixed with the hydantoin. Table II gives the results obtained when molded cakes prepared as described above, but using naphthalene in place of para-chlorobenzene were immersed in water as described, and the water was tested for chlorine content. In the table, the letters F, G, and H designate molded cakes comprising, respectively, and by weight, 80%, 60% and 40% of naphthalene and 20%, 40% and 60% of 1,3-dichloro-5,5-dimethylhydantoin.

Table II

[Chlorine in parts/million.]

|   | 30 Mins. | 6 Hrs. | 18 Hrs. |
|---|---|---|---|
| F | 0.2 | 5.0 | 7.0 |
| G | 4.0 | 8.0 | 10.0 |
| H | 12.0 | 11.0 | 15.0 |

The retardant may be selected, therefore, to give compositions which result in aqueous media containing higher or lower chlorine concentrations.

The results shown in Tables I and II were obtained under static conditions, i. e., while both the molded cakes and the water were at rest. Table III gives the results obtained when water was caused to flow continuously for the given time periods over the surface of cakes molded as described above from mixtures of 1,3-dichloro-5,5-dimethylhydantoin and para-dichlorobenzene, and the water, after passing over the surfaces of the cakes was collected and tested for chlorine content. In the table, the letters H to K designate cakes comprising, respectively, and by weight, 20%, 40%, 60% and 80% of 1,3-dichloro-5,5-dimethylhydantoin and 80%, 60%, 40% and 20% of paradichlorobenzene. The water flowed over the cakes H to K, respectively, at the following rates: 9.7 gals./hr., 12.4 gals./hr., 7.9 gals./hr., and 8.5 gals./hr.

Table III

[Time of exposure to running water.]

|   | 1 Hr. | 2 Hrs. | 4 Hrs. | 10 Hrs. | 20 Hrs. |
|---|---|---|---|---|---|
| H | 1.1 | 2.0 | 2.0 | 2.0 | 2.0 |
| I | 2.1 | 3.0 | 3.0 | 3.1 | 3.0 |
| J | 19.0 | 20.0 | 19.0 | 20.0 | 20.0 |
| K | 20.0 | 20.0 | 20.0 | 20.0 | 20.0 |

As is evident from Table III, the amount of chlorine evolved over a given time period when a stream of running water passes over a molded or compressed mixture of 1,3-dichloro-5,5-dimethylhydantoin and a decomposition retardant in accordance with the invention can be controlled not only by controlling the rate of flow of the running water, but also by preselection of the amount of 1,3-dichloro-5,5-dimethylhydantoin in the product. The results show that the concentration of chlorine in the running water can be readily kept well above the minimum normally required for inhibiting the growth of bacteria which produce obnoxious odors and sufficiently high to destroy most harmful germs.

Table IV gives the results obtained when cakes molded as described above and comprising, by weight, 20% of 1,3-dichloro-5,5-dimethylhydantoin and 80% of the organic volatile retardant specified, were placed in water which was tested for chlorine content at the time intervals stated.

Table IV

| Substance Mixed with the Hydantoin | Chlorine in Parts/Million | |
|---|---|---|
|  | 1 Hr. | 24 Hrs. |
| Camphor | 3.0 | 6.0 |
| Hexachloroethane | 4.0 | 37.0 |
| 4,4-dimethyl benzophenone | 4.0 | 31.0 |
| O-diphenyl benzene | 2.0 | 16.0 |

The compositions of the invention having the combination of disinfecting and deodorizing properties are adapted to a variety of important uses. For example, molded products comprising the mixture of 1,3-dichloro-5,5-dimethylhydantoin and retardant may be disposed or suspended in latrines, urinals, or toilets, or they may be hung or otherwise disposed in closets, used in bleaching fabrics and the like, to provide chlorine water for chemical reactions, in the treatment of soil, etc.

The conditions under and the purposes for which the compositions are to be used will determine the relative proportions of 1,3-dichloro-5,5-dimethylhydantoin and retardant used in making them. For instance, if molded blocks or cakes comprising the compositions are to be used under conditions such that they are only intermittently contacted with water, as for example if they are to be suspended in toilet bowls above the level of the standing water normally present therein and only contacted with water during the flushing periods, the evolution of chlorine will take place intermittently and therefore it is preferred to use products comprising relatively high proportions, say between 50% and 95% of the 1,3-dichloro-5,5-dimethylhydantoin. On the other hand, when the molded compositions are at least partially immersed in water in use, as when they are to be laid in toilet bowls or the like, and more or less covered with water, the decomposition and evolution of chlorine proceeds slowly but continuously and under such circumstances the composition may comprise a lower proportion of the 1,3-dichloro-5,5-dimethylhydantoin, i. e., proportions below 50% by weight and even as low as 5% by weight. The proportion of the hydantoin in the composition may also be predicated on the severity of the conditions which the products are to combat. Thus, when cakes molded as described above from a fused mixture of 15 gms. of 1,3-dichloro-5,5-dimethylhydantoin and 85 gms. of paradichlorobenzene were used in toilets and urinals and the effect was observed over a period of two months, it was found that satisfactory deodorizing was achieved and that the odor normally associated with those places could not be detected. However, when cakes comprising those same ingredients were used under conditions requiring stronger sanitizing and deodorizing action, it was found preferable to use compositions comprising 40 gms. of 1,3-dichloro-5,5-dimethylhydantoin and 60 gms. of para-dichlorobenzene.

As has been indicated, the compositions are not limited to use in sanitation. Thus, they may be used in water to maintain it at a chlorine concentration of between 15 and 30 parts of chlorine per million parts of water, such water being useful as a gentle bleach for fabrics and the like. Also, it was found that when pellets comprising a mixture, of 1,3-dichloro-5,5-dimethylhydantoin and a retardant such as para-dichlorobenzene are planted in soil to a depth of from ½ inch to 2 inches, moisture in the soil induces generation of chlorine in an amount which may be readily controlled by selection of the composition, with the result that the soil is benefited and the invasion of the soil by fungi is prevented and/or fungi present therein is destroyed. The treatment also results in expulsion and/or destruction of worms and insects in the soil. Thus, when small pellets obtained by molding a fused mixture comprising 40% of 1,3-dichloro-5,5-dimethylhydantoin having an average particle size of ¼" mesh and 60% of para-dichlorobenzene were planted in soil so that the soil contained ½ ounce of the mixture per square foot, chlorine was evolved over a period of about 15 days, with beneficial effect on the soil.

When blocks or other shaped products comprising a mixture of 1,3-dichloro-5,5-dimethylhydantoin and the retardant, for example blocks molded from mixtures comprising 15% of the hydantoin and 85% of para-dichlorobenzene, were hung in damp closets, it was found that the odor of the air was not only improved due to evaporation of the para-dichlorobenzene, but that the mustiness was also dispeled by chlorine generated under the influence of the dampness of the air. When camphor is used in place of or in addition to the para-dichlorobenzene, the products exhibit a moth-repelling effect.

It is found, further, that in the presence of water containing alkalis and alkaline salts, the present compositions yield hypochlorites. Even the small amount of calcium carbonate and calcium bicarbonate in solution in natural waters results in the production of hypochlorites when the compositions comprising 1,3-dichloro-5,5-dimethylhydantoin are added to them. In addition to the hypochlorites formed, a surplus of chlorine is built up in the solution, so that the solution is more reactive chemically and more bactericidal when the compositions are added to alkaline water. Table V shows the results obtained when cakes molded as described above from a fused mixture of 1,3-dichloro-5,5-dimethylhydantoin and para-dichlorobenzene were allowed to stand in one liter portions of a saturated solution of calcium carbonate at 25° C., and the water was tested at the stated time intervals for "available chlorine." In the table, the letters O to T inclusive designate cakes comprising, respectively, and by weight, 20%, 40%, 60% and 80% of 1,3-dichloro-5,5-dimethylhydantoin and 80%, 60%, 40% and 20% of para-dichlorobenzene.

Table V

[Chlorine in parts/million.]

|   | 30 mins. | 2 Hrs. | 18 Hrs. | 24 Hrs. |
|---|---|---|---|---|
| O | 16 | 41 | 115 | 130 |
| R | 18 | 42 | 115 | 130 |
| S | 18 | 42 | 120 | 130 |
| T | 18 | 43 | 124 | 135 |

Table VI gives the resuls when cakes comprising the ingredients in the same proportions were immersed in one-liter portions of water containing potassium carbonate in an amount which was the molar equivalent of the calcium carbonate.

Table VI

[Chlorine in parts/million.]

|   | 30 Mins. | 6 Hrs. | 18 Hrs. | 24 Hrs. |
|---|---|---|---|---|
| O | 10 | 27 | 46 | 51 |
| R | 16 | 50 | 78 | 91 |
| S | 20 | 95 | 137 | 148 |
| T | 23 | 115 | 161 | 168 |

At the end of 24 hours, the solutions of both Tables V and VI were found to give strong positive tests for chlorine by the potassium iodide starch paper test.

Although the invention has been discussed in detail in connection with the control of the rate of decomposition of 1,3-dichloro-5,5-dimethylhydantoin and regulation of the evolution of chlorine concomitantly with the decomposition, control of the decomposition and of the rate of release of bromine from 1,3-dibromo-5,5-dimethylhydantoin in contact with water may also be realized by admixing the dibromo- compound with a retardant as disclosed herein to obtain solutions which contain bromine or, in the case of water containing alkalis and alkaline carbonates, hypobromites. Such solutions may be used, for instance, as a source of bromine water for chemical reactions and for other purposes. Table VII gives the results obtained when cakes molded as described hereinabove from a fused mixture of 80 gms. of 1,3-dibromo-5,5-dimethylhydantoin and 120 gms. of para-dichlorobenzene were immersed in one liter of water and the water was tested for bromine content at the given time intervals.

Table VII

[Bromine in parts/million.]

| 70 Mins. | 1.5 Hrs. | 5 Hrs. |
|---|---|---|
| 0.7 | 18 | 32 |

The blends of the invention may be prepared by intimately admixing the hydantoin and retardant by any suitable means for comminuting and admixing solid chemical substances, and the mixtures may be compressed, or fused and molded. Both components of the blend should be completely dry when they are mixed and contact with moisture should be avoided during handling or processing thereof, and during storage prior to use to maintain them in substantially dry stable condition. The blends may be modified by the inclusion therein of small amounts of various adjuvants such as perfumes, coloring aids, for example finely divided pigments, and other effect materials.

Since variations and modifications may be made in practicing the invention without departing from the spirit and scope thereof, it is to be understood that the invention is not to be limited to the specific details set forth herein.

I claim:

1. A composition which generates a halogen selected from the group consisting of chlorine and bromine in moisture at a controlled rate and consisting essentially of a substantially dry intimate compressed mixture of about 5% to 95% by weight of a dihalo-hydantoin selected from the group consisting of 1,3-dichloro-5,5-dimethylhydantoin and 1,3-dibromo-5,5-dimethylhydantoin and the remainder at least one retardant for the rate of decomposition of the dihalo-hydantoin in moisture and of the rate of release of the halogen therefrom to the moisture which is selected from the group consisting of naphthalene, paradichlorobenzene, hexachloroethane, 4,4-dimethylbenzophenone, o-diphenyl benzene and camphor.

2. A composition according to claim 1, characterized in that the retardant mixed with the dihalo-hydantoin is naphthalene.

3. A composition according to claim 1, characterized in that the retardant mixed with the dihalo-hydantoin is paradichlorobenzene.

4. A composition according to claim 1, characterized in that the retardant mixed with the dihalo-hydantoin is hexachloroethane.

5. A composition according to claim 1, characterized in that the retardant mixed with the dihalo-hydantoin is o-diphenylbenzene.

6. A composition according to claim 1, characterized in that the retardant mixed with the dihalo-hydantoin is camphor.

7. The method of generating the halogen contained in a dihalo-hydantoin selected from the group consisting of 1,3-dichloro-5,5-dimethylhydantoin and 1,3-dibromo-5,5-dimethylhydantoin at a controlled rate in the presence of moisture which comprises intimately mixing about 5% to 95% by weight of the dihalo-hydantoin with at least one retardant for the rate of decomposition thereof in moisture and of the rate of release of the halogen therefrom to the moisture and selected from the group consisting of naphthalene, paradichlorobenzene, hexachloroethane, 4,4-dimethyl benzophenone, o-diphenylbenzene and camphor to obtain a substantially dry compressed mixture of the two, and exposing said mixture to moisture.

8. The method according to claim 7, characterized in that the retardant mixed with the dihalo-hydantoin is naphthalene.

9. The method according to claim 7, characterized in that the retardant mixed with the dihalo-hydantoin is paradichlorobenzene.

10. The method according to claim 7, characterized in that the retardant mixed with the dihalo-hydantoin is hexachloroethane.

11. The method according to claim 7, characterized in that the retardant mixed with the dihalo-hydantoin is o-diphenylbenzene.

12. The method according to claim 7, characterized in that the retardant mixed with the dihalo-hydantoin is camphor.

References Cited in the file of this patent
UNITED STATES PATENTS

| | | |
|---|---|---|
| 1,496,279 | Shibata | June 3, 1924 |
| 1,702,168 | Moore | Feb. 12, 1929 |
| 1,845,977 | Fuller | Feb. 16, 1932 |
| 1,924,507 | Markowsky | Aug. 29, 1933 |
| 1,982,909 | Flint | Dec. 4, 1934 |
| 2,156,789 | Missbach | May 2, 1939 |
| 2,377,446 | Payne | June 5, 1945 |
| 2,422,255 | Peters | June 17, 1947 |